No. 715,056. Patented Dec. 2, 1902.
J. C. H. GRUNER.
AUXILIARY HANDLE FOR SHOVELS.
(Application filed Aug. 5, 1902.)
(No Model.)
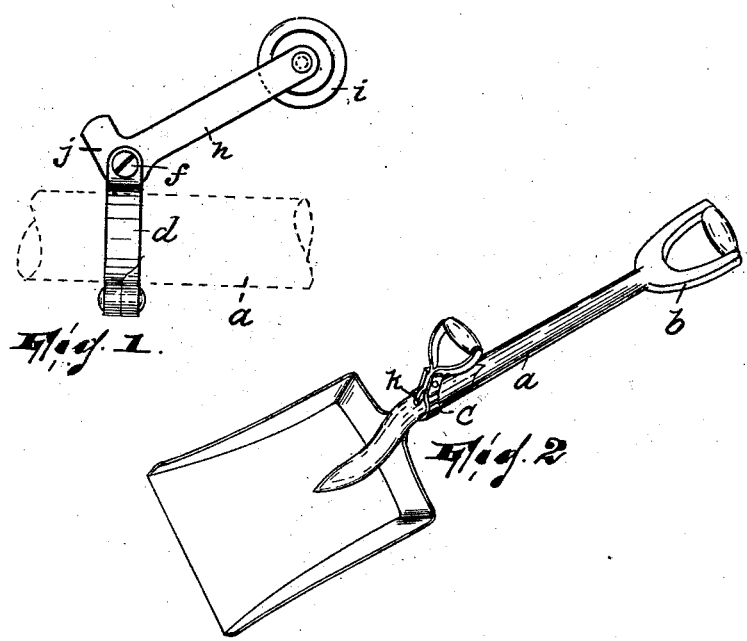
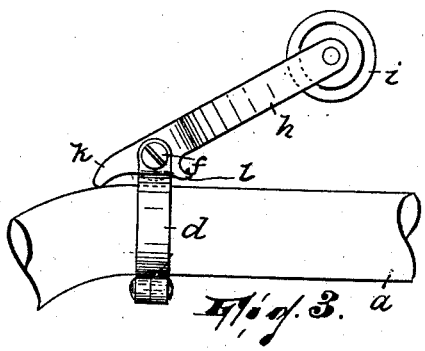
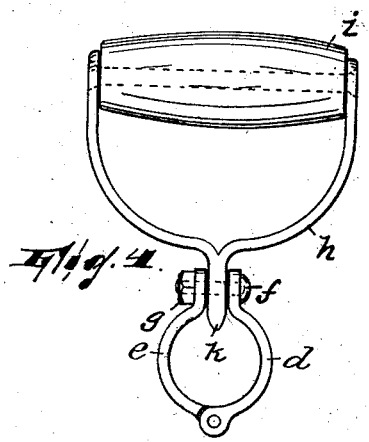
WITNESSES: INVENTOR,
John C. H. Gruner,
BY
ATTORNEYS.

UNITED STATES PATENT OFFICE.

JOHN C. H. GRUNER, OF PATERSON, NEW JERSEY, ASSIGNOR OF ONE-THIRD TO F. J. KELLER, OF PATERSON, NEW JERSEY.

AUXILIARY HANDLE FOR SHOVELS.

SPECIFICATION forming part of Letters Patent No. 715,056, dated December 2, 1902.

Application filed August 5, 1902. Serial No. 118,482. (No model.)

*To all whom it may concern:*

Be it known that I, JOHN C. H. GRUNER, a citizen of the United States, residing in Paterson, in the county of Passaic and State of New Jersey, have invented certain new and useful Improvements in Auxiliary Handles for Shovels; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention has for its object to provide an auxiliary handle for shovels, pitchforks, and other like implements requiring the use of both hands in using them; and it consists in such an auxiliary handle, as well as the combination thereof with the shaft portion of any such implement as is above indicated.

The invention will be found fully illustrated in the accompanying drawings, wherein—

Figure 1 is a side view of one form of the device. Fig. 2 is a perspective view of the preferred form of the device, showing it attached to a shovel; and Figs. 3 and 4 are respectively a side and front view of the preferred form of the device.

On the shaft portion $a$ of a shovel or other like implement and at a convenient distance from the handle portion $b$ of said shaft is secured a shackle $c$, this being the preferred form of mounting means for my auxiliary handle. Said shackle preferably consists of two hinged members $d$ and $e$, adapted to be clamped as a band around the shaft $a$ by means of a bolt $f$ and nut $g$. On the bolt $f$ is pivoted the forked portion $h$ of a handle, the same being provided with a suitable grip $i$.

It is preferable that this auxiliary handle be pivotally connected with the mounting $c$, as thereby convenience in using the shovel is greatly enhanced. The pivotal mounting of the auxiliary handle, however, is not absolutely essential.

Where the auxiliary handle is pivoted in its mounting, it is preferable that its pivotal portion be provided with a lug $j$, which will keep said handle from swinging over out of the position where it can be most readily grasped.

In the preferred form of the device it is desirable to provide instead of the lug $j$ a spur $k$, which being practically an elongation of the pivotal portion of the fork $h$ and being appreciably longer than from the pivot $f$ to the shaft $a$ of the implement not only acts to keep the auxiliary handle from swinging over out of a convenient position for grasping it, but by acting as a stop to limit the swing of the auxiliary handle beyond the position thereof shown in Fig. 3 imparts to the latter a certain rigidity between the same and the handle $b$, which greatly facilitates the handling of the shovel or other implement.

As shown in Fig. 3, the handle may be provided near the pivoting-bolt $f$ with a reversely-extending projection $l$, forming a hook, whereby when the device is detached from the shovel it may be used for various other purposes, such as lifting.

Having thus fully described my invention, what I claim as new, and desire to secure by Letters Patent, is—

1. The combination, with the shaft of the shovel, of a device adapted as an auxiliary handle consisting of a handle member, and a mounting member, said mounting member comprising two hinged parts surrounding the shaft, and means for securing the free ends of said parts together, and said handle member being pivotally mounted in said mounting member, substantially as described.

2. The combination, with the shaft of the shovel, of a device adapted as an auxiliary handle consisting of a handle member and a mounting member, said mounting member comprising two hinged parts surrounding the shaft, and means for securing the free ends of said parts together, and said handle member being pivotally mounted in said mounting member, and a projection forming a longitudinal extension of said handle member and extending farther from the pivot thereof than said pivot is from the adjacent portion of the shaft, substantially as described.

In testimony that I claim the foregoing I have hereunto set my hand this 10th day of July, 1092.

JOHN C. H. GRUNER.

Witnesses:
ALFRED GARTNER,
WALTER SCOTT.